(12) United States Patent
Matsubara et al.

(10) Patent No.: US 7,851,086 B2
(45) Date of Patent: Dec. 14, 2010

(54) ELECTRODE MATERIAL FOR A LITHIUM SECONDARY BATTERY, LITHIUM SECONDARY BATTERY, AND PREPARATION METHOD FOR THE ELECTRODE MATERIAL FOR A LITHIUM SECONDARY BATTERY

(75) Inventors: Keiko Matsubara, Yokohama (JP); Toshiaki Tsuno, Yokohama (JP); Akira Takamuka, Yokohama (JP); Sung-Soo Kim, Suwon-si (KR); Bok-Hwan Jung, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/334,376

(22) Filed: Dec. 12, 2008

(65) Prior Publication Data

US 2009/0101865 A1  Apr. 23, 2009

Related U.S. Application Data

(62) Division of application No. 10/961,468, filed on Oct. 8, 2004, now Pat. No. 7,479,351.

(30) Foreign Application Priority Data

Oct. 9, 2003 (JP) .............................. 2003-350625
May 21, 2004 (KR) ............................ 2004-0036294

(51) Int. Cl.
*H01M 4/58* (2010.01)

(52) U.S. Cl. .................. 429/218.1; 429/219; 429/220; 429/209; 252/182.1; 427/58

(58) Field of Classification Search .............. 429/218.1, 429/219, 220, 209; 252/182.1; 427/58
See application file for complete search history.

(56) References Cited

U.S. PATENT DOCUMENTS

| 6,300,013 | B1 | 10/2001 | Yamada et al. | |
| 6,835,496 | B1 * | 12/2004 | Kaminaka et al. | ........ 429/218.1 |
| 7,141,187 | B2 | 11/2006 | Kosuzu et al. | |

FOREIGN PATENT DOCUMENTS

| JP | 58-141361 | * | 8/1983 |
| JP | 2001-283848 | | 10/2001 |
| JP | 2002-075351 | * | 3/2002 |
| JP | 2002-216746 | | 8/2002 |

OTHER PUBLICATIONS

Patent Abstract of Japan Publication No. 2002-216746, dated Aug. 2, 2002 in the named of Hashimoto Takuya, et al.

* cited by examiner

*Primary Examiner*—Laura S Weiner
(74) *Attorney, Agent, or Firm*—Christie, Parker & Hale, LLP

(57) ABSTRACT

Disclosed is an electrode material for a lithium secondary battery, a lithium secondary battery comprising the same, and a method for preparing the electrode material for a lithium secondary battery. The electrode material for a lithium secondary battery includes Si as a principal component, wherein the interplanar spacing of an Si (111) surface is between 3.15 Å and 3.20 Å using X-ray diffraction. This is achieve by first alloying Si with an element selected from the group consisting of Al, B, P, Ge, Sn, Pb, Ni, Co, Mn, Mo, Cr, V, Cu, Fe, Ni, W, Ti, Zn, alkali metals, alkaline earth metals, and combinations thereof, and then eluting X from the resulting alloy.

5 Claims, 1 Drawing Sheet

ELECTRODE MATERIAL FOR A LITHIUM SECONDARY BATTERY, LITHIUM SECONDARY BATTERY, AND PREPARATION METHOD FOR THE ELECTRODE MATERIAL FOR A LITHIUM SECONDARY BATTERY

CROSS REFERENCE TO RELATED APPLICATION

This application is a divisional application of U.S. patent application Ser. No. 10/961,468, now U.S. Pat. No. 7,479,351, filed Oct. 8, 2004 which claims priority to and the benefits of Japanese Patent Application No. 2003-350625, filed on Oct. 9, 2003, and Korean Patent Application No. 10-2004-0036294, filed on May 21, 2004, both of which are hereby incorporated by reference in their entireties for all purposes as if fully set forth herein.

FIELD OF THE INVENTION

The present invention relates to an electrode material for a lithium secondary battery, a lithium secondary battery comprising the same, and a method for preparing the electrode material for a lithium secondary battery.

BACKGROUND OF THE INVENTION

Alloy materials including Si and Sn are drawing attention as electrode materials that can be alloyed with Li for lithium secondary batteries. Batteries made with such materials offer high charge and discharge capacity. Among the alloy materials, amorphous alloy materials or microcrystalline alloy materials show superior cycle characteristics to crystalline alloy materials. For example, Japanese patent laid-open No. 2002-216746 discloses a method for forming an amorphous or microcrystalline alloy material comprising Si by adding an element such as Al to Si to prepare molten alloy and then cooling the molten alloy rapidly to thereby obtain a rapidly solidified alloy.

In the preparation of a rapidly solidified alloy containing Si, single phase Si, which has a relatively large crystal particle, should be prevented from being deposited in order to obtain an amorphous or microcrystalline alloy. For this, the content of Si should be no more than 50%. If the Si content is maintained at more than 50%, the amount of a negative active material is decreased and thus the charge and discharge capacity is degraded.

Another method of forming a 100% Si amorphous or microcrystalline structure is to form a Si layer with a Chemical Vapor Deposition (CVD) method by using silane gas. However, this also has shortcomings in that it is difficult to form a sufficiently thick Si layer.

SUMMARY OF THE INVENTION

In one embodiment of the present invention, an electrode material for a lithium secondary battery is provided which has a microcrystalline structure and includes Si as a principal component. In another embodiment, a lithium secondary battery is provided comprising such an electrode material.

In yet another embodiment of the present invention, a method for preparing the electrode material for a lithium secondary battery is provided.

In accordance with an embodiment of the present invention, an electrode material for a lithium secondary battery includes Si as a principal component, wherein the interplanar spacing of an Si (111) surface is between 3.15 Å and 3.20 Å using X-ray diffraction.

In accordance with another embodiment of the present invention, an electrode material for a lithium secondary battery includes Si and an element Y which is selected from the group consisting of Ag, Cu, Au and combinations thereof, wherein the interplanar spacing of an Si (111) surface is between 3.15 Å and 3.20 Å using X-ray diffraction.

DETAILED DESCRIPTION OF THE INVENTION

Figure 1:
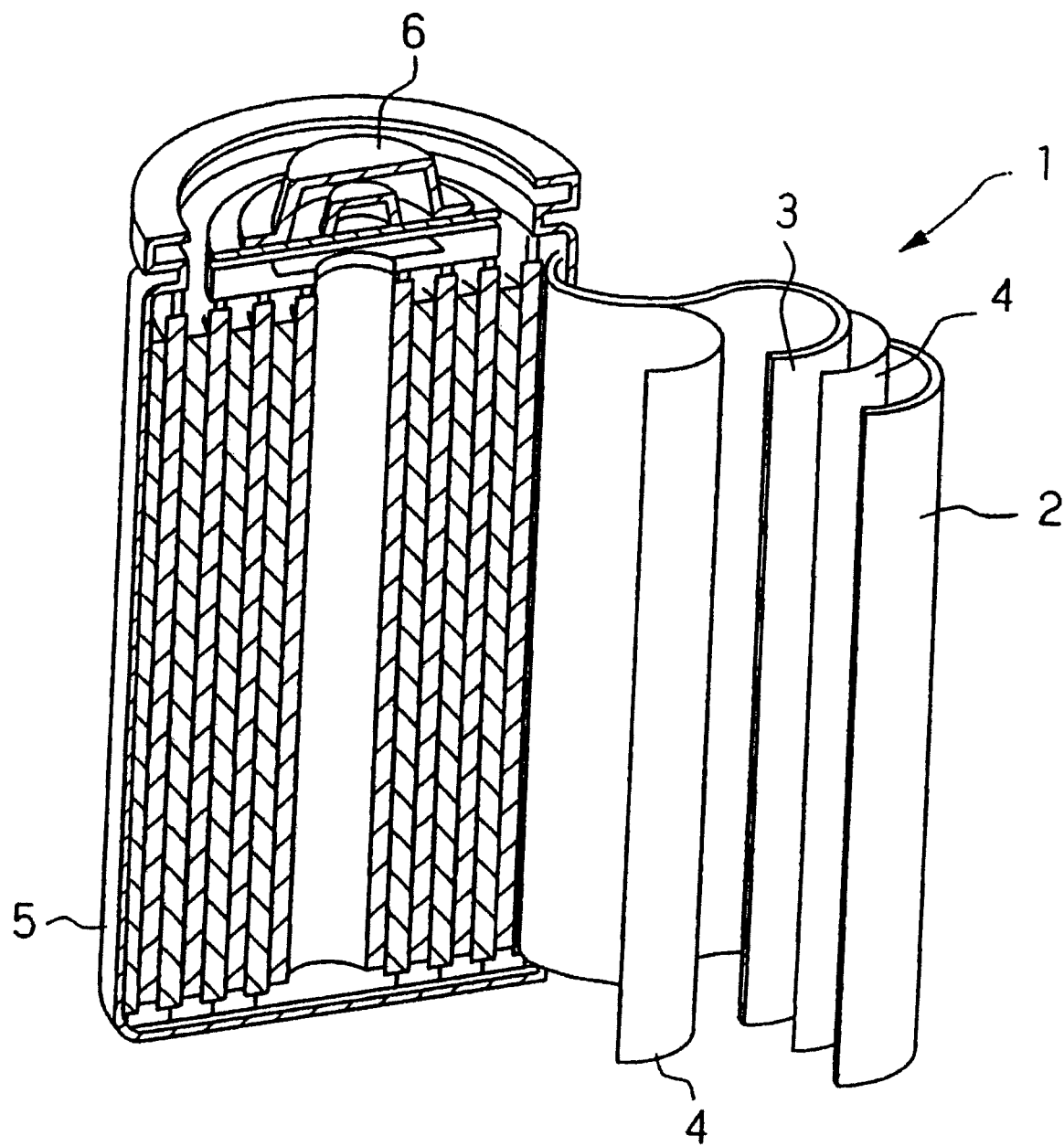
FIG. 1 is a schematic view showing an embodiment of a lithium secondary battery according to the present invention.

Other aspects of the invention will become apparent from the following description of the embodiments with reference to the accompanying drawing.

An electrode material for a lithium secondary battery of the present invention has improved cycle characteristics, because it has a microcrystalline structure and interplanar spacing of an Si (111) surface between 3.15 Å and 3.20 Å when the X-ray diffraction is measured.

The electrode material can be easily alloyed with lithium upon charging, and provides increased charge and discharge capacity by including an element Y and thus reducing the specific resistance of the electrode material.

The electrode material for a lithium secondary battery of the present invention is prepared by alloying Si and an element X that has been rapidly solidified, and then removing element X from the rapidly solidified alloy through chemical treatment. The alloy contains Si at no more than the Si content of a composition at the eutectic point of an SiX alloy. Element X is selected from the group consisting of Al, B, P, Ge, Sn, Pb, Ni, Co, Mn, Mo, Cr, V, Cu, Fe, Ni, W, Ti, Zn, alkali metals, alkaline earth metals and combinations thereof.

In producing the electrode material for a lithium secondary battery of the present invention, Si is first alloyed with element X, an element that can be alloyed with Si, and optionally, element Y, and the electrode is prepared by removing element X through chemical treatment. The SiX alloy contains Si at no more than the Si content of a composition at the eutectic point of an SiX alloy. Element X is selected from the group consisting of Al, B, P, Ge, Sn, Pb, Ni, Co, Mn, Mo, Cr, V, Cu, Fe, Ni, W, Ti, Zn, alkali metals, alkaline earth metals, and combinations thereof. Element Y is selected from the group consisting of Ag, Cu, Au, and combinations thereof. However, Cu is not selected for both of element X and element Y.

In accordance with the present invention, the rapidly solidified alloy is prepared from Si and element X, and then element X is removed from the rapidly solidified alloy. This provides an increased Si content in the electrode material and improves the charge and discharge capacity.

Preferably, the Si content of the electrode material for a lithium secondary battery is in the range of 70 wt % to 100 wt %. Since this composition increases the Si content in the electrode material, the charge and discharge capacity is improved.

Also preferably, the electrode material for a lithium secondary battery has a specific surface area between 2 m²/g and 30 m²/g. This increases the contact surface between Si and lithium ions, and contributes to a smooth alloying process between Si and lithium and improves the cycle characteristics as well.

Further, in the present invention, it is preferable that the electrode material for a lithium secondary battery has a particle diameter of 0.2 μm to 50 μm. This promotes the alloying process with lithium even inside the electrode material, and thus, improves the charge and discharge characteristics.

In addition, the electrode material for a lithium secondary battery of the present invention can be prepared from a complex of the above-described electrode material and graphite. In this structure, the graphite functions as a negative active material that intercalates and deintercalates lithium upon charge and discharge, as well as functioning as a conductor of the electrode material containing Si.

A lithium secondary battery of the present invention includes the electrode material for the lithium secondary battery, it has excellent cycle characteristics and high charge and discharge capacity.

The method for preparing an electrode material for a lithium secondary battery includes the step of preparing a rapidly solidified alloy by cooling down a molten alloy which contains Si and X, an element that can be alloyed with Si, where the Si is at no more than the Si content of a composition at the eutectic point of an SiX alloy. Element X is removed by immersing the rapidly solidified alloy in a solution that can dissolve element X.

Also, the method for preparing an electrode material for a lithium secondary battery can further include the step of including element Y in the SiX alloy. Element Y is an element selected from the group consisting of Ag, Cu, Au and combinations thereof. Element X is removed by immersing the rapidly solidified alloy in a solution that can dissolve element X.

According to these methods, a rapidly solidified alloy having a microcrystalline structure is obtained by rapidly cooling down the molten alloy which includes Si and element X and contains the Si at no more than the Si content of a composition at the eutectic point of SiX alloy. The Si content is relatively increased by removing element X from the rapidly solidified alloy.

Since the electrode material obtained as above has a high Si content and a microcrystalline structure, it can increase the charge and discharge capacity as well as improve the cycle characteristics.

In addition, since the Si content is no more than that of the composition at the eutectic point, a large Si single phase is not formed in the rapidly solidified alloy powder and the entire structure is microcrystalline.

The electrode material for a lithium secondary battery includes an alloy powder containing Si as its principal component, and the interplanar spacing of an Si (111) surface is in the range of 3.15 Å to 3.20 Å using X-ray diffraction.

Also, the electrode material for a lithium secondary battery of the present invention optionally includes an alloy powder containing Si, and element Y where Y is selected from the group consisting of Ag, Cu, Au and combinations thereof. The interplanar spacing of an Si (111) surface is in the range of 3.15 Å to 3.20 Å using X-ray diffraction.

The electrode material for a lithium secondary battery can be prepared by first producing a rapidly solidified alloy powder containing Si, an element X that can be alloyed with Si, and optionally, element Y. Element X is then removed through chemical treatment. Element X is an element selected from the group consisting of Al, B, P, Ge, Sn, Pb, Ni, Co, Mn, Mo, Cr, V, Cu, Fe, Ni, W, Ti, Zn, alkali metals, alkaline earth metals and combinations thereof. Cu is not selected for both element X and element Y.

Since the electrode material for a lithium secondary battery is prepared by forming a rapidly solidified alloy powder from Si and element X and removing element X from the rapidly solidified alloy powder, the Si content is increased in the electrode material, which leads to increased charge and discharge capacity.

In addition, since the rapidly solidified alloy powder formed from Si and element X has a microcrystalline structure and the microcrystalline structure is maintained even after the removal of element X, a microcrystalline structure of Si can be obtained.

During charging, the Si is alloyed with lithium to thereby form a $Li_xSi_y$ phase, and then it returns to a Si single phase by releasing lithium during discharging. The Si functions as a negative active material of a lithium secondary battery. The Si has a microcrystalline structure containing numerous microcrystal particles. This permits a minor change in volume while preventing pulverization of the electrode material. Therefore, the cycle characteristics are improved.

Also, the addition of element Y which is at least one selected from the group consisting of Ag, Cu, and Au, can decrease the specific resistance of the electrode material. Thus, lithium can be more easily alloyed with electrode materials during charging, and as a result, the charge and discharge capacity is further improved.

Among electrode materials for a lithium secondary battery, an electrode material containing Si as its principal component includes Si in an amount of more than or equal to 70 wt %, and more preferably, it includes Si in an amount of up to 100 wt %.

For those electrode materials for a lithium secondary battery in which the electrode material further contains element Y, the Si content is preferably in the range of 70 wt % to less than 100 wt %.

If the Si content is less than 70 wt %, the decrease in the Si content in the electrode material leads to degradation in the charge and discharge capacity, which is undesirable. By limiting the upper limit of the Si content in the electrode material to less than 100 wt %, the electrode material will necessarily include some amount of element Y. Preferably, the content of element Y in the electrode material is between 0.1 wt % and 30 wt %. This composition can increase the Si content in the electrode material and thus improve the charge and discharge capacity.

Also, the Si of the microcrystalline structure preferably has interplanar spacing of a (111) surface in the range of 3.15 Å to 3.20 Å. If the planar surface of the (111) surface is less than 3.15 Å, the crystal particles are coarse and the structure cannot be called a microcrystalline structure. Such a structure exhibits a large change in volume during charging and discharging and degraded cycle characteristics making it undesirable. Also, if the planar surface of the (111) surface is equal to or more than 3.20 Å, the structure cannot be called an Si single phase, which is also undesirable.

Preferably, the electrode material for a lithium secondary battery has a BET (Brunauer, Emmett, Teller) specific surface area of 2 $m^2/g$ to 30 $m^2/g$ using a nitrogen adsorption measuring method. With this range of BET specific surface areas, the contact area between Si and lithium ions can be widened and the wide contact area contributes to a smooth alloying process between Si and lithium and improved cycle characteristics.

Also, it is preferable that the electrode material for a lithium secondary battery has a powder particle diameter between 0.2 μm and 50 μm. Since the electrode material includes particles as fine as 0.2 μm to 50 μm, the alloying with lithium occurs to the inside of a particle and thus the charge and discharge capacity can be improved.

Also, the electrode material of the present invention can use a composite powder obtained by fixing and compounding graphite particles to and with the powder of the above electrode material. The composite electrode material functions as a negative active material upon charge and discharge by intercalating/deintercalating lithium as well as functioning as a conductor of an electrode material having an Si-graphite composite as its principal component to help smooth the Si charge and discharge reaction. The electrode material cannot be compounded with but is simply mixed with graphite.

Hereinafter, a method for preparing an electrode material for a lithium secondary battery will be described.

The method of preparing an electrode material includes a process of producing a rapidly solidified alloy powder, and a process of removing element X from the rapidly solidified alloy powder.

In the process of obtaining the rapidly solidified alloy powder, first, a molten alloy is prepared by heating and melting a mixture of Si and element X or an ingot is prepared by melting Si and element X in advance. Element X is selected from the group consisting of Al, B, P, Ge, Sn, Pb, Ni, Co, Mn, Mo, Cr, V, Cu, Fe, Ni, W, Ti, Zn, alkali metals, alkaline earth metals and combinations thereof. The Si content in the molten alloy is no more than the Si content of a composition at the eutectic point of the SiX alloy. The molten alloy is cooled down rapidly to thereby produce the rapidly solidified alloy powder.

The eutectic point varies depending on the element selected for X. Therefore, the Si content is determined based on the element X. For example, if element X is Al, the composition at the eutectic point is 12.1 wt % Si, and 87.9 wt % Al. Therefore, it is preferable that the Si content be no more than 12.1 wt %.

If the Si content exceeds the composition at the eutectic point, Si single phase is deposited in the structure of the rapidly solidified alloy powder and the structure cannot be a microcrystalline structure, which is undesirable.

The molten alloy optionally comprises an element Y which is an element selected from the group consisting of Ag, Cu, Au and combinations thereof. In the molten alloy, it is preferable that the Si content is no more than a composition at the eutectic point of the SiX alloy, regardless of the amount of element Y added thereto. Preferably, the amount of element Y added to the molten alloy is in the range of 0.1 wt % to 30 wt % with respect to Si.

Methods of cooling down the molten alloy rapidly include a gas atomization method, a water atomization method, and a roll rapid solidification method. According to the gas atomization method and water atomization method, rapidly solidified alloy powder is obtained, while a rapidly solidified alloy thin film is obtained from the roll solidification method. The rapidly solidified alloy thin film goes through a pulverization process to become powder. The average particle diameter of the obtained rapidly solidified alloy powder becomes the average particle diameter of the electrode material powder, which will be produced. Therefore, when the rapidly solidified alloy powder is prepared, it is necessary to control the average particle diameter in the range of 0.2 μm to 50 μm.

The rapidly solidified alloy powder obtained from the molten alloy is a rapidly solidified alloy, part of which may be of an amorphous phase and the other part of which is of a microcrystalline structure, or it is a rapidly solidified alloy of a sole microcrystalline structure.

The rapidly solidified alloy powder necessarily includes an SiX phase, and if the amount of element X is excessive, it includes a single phase of element X as well. Further, if an element Y is added, an element Y single phase or SiY phase is precipitated.

Preferably, the rapid solidification rate for rapid solidification is performed by cooling at 100 K/sec and faster. If the rapid solidification rate is lower than 100 K/sec, each of the SiX phase, X phase, Y phase, and SiY phase may not be precipitated equally in the alloy structure. Also, since the crystal size of each phase becomes coarse, the effects of preventing expansion and granting conductivity cannot be obtained equally, which is undesirable.

Element X is removed from the rapidly solidified alloy powder by being eluted. In order to elute and remove element X, the rapidly solidified alloy powder is immersed in a solution that dissolves only element X but not Si or element Y.

For example, if element X is Al, it is desirable to use hydrochloric acid as the solution for eluting X.

More specifically, for such an embodiment of the invention, the rapidly solidified alloy powder is immersed in hydrochloric acid aqueous solution, rinsed, and dried. The immersion is carried out under slow agitation at room temperature for 30 minutes to 5 hours, and the concentration of the hydrochloric acid aqueous solution is preferably between 1N and 5N.

The above-mentioned conditions for eluting X from the alloy are no more than an example, and in the actual circumstances, the elution conditions can be determined as conditions that can confirm that there is little if any remaining element X in the rapidly solidified alloy powder. If the elution conditions are insufficient, element X exists in the form of an SiX alloy and the Si of the SiX alloy cannot be used for the charge and discharge reaction with lithium as it would degrade the charge and discharge capacity.

After element X is removed, the specific surface area of the rapidly solidified alloy powder becomes between 2 $m^2$/g to 30 $m^2$/g, which is 100 times greater than the specific surface area of the original rapidly solidified alloy powder. The specific surface area is increased because element X is removed and the space occupied by element X remains as a pore.

Finally, the electrode material for a lithium secondary battery is obtained by rinsing and drying the rapidly solidified alloy powder after element X has been removed.

Hereinafter, a rechargeable lithium battery is described. The rechargeable lithium battery comprises a negative electrode comprising the negative active material, a positive electrode, and an electrolyte. One embodiment of such a rechargeable lithium secondary battery is illustrated in FIG. 1. According to FIG. 1, the rechargeable lithium battery 1 includes an electrode assembly comprising a negative electrode 2; a positive electrode 3; and an optional separator 4 interposed between the negative and positive electrodes. The electrode assembly is placed within a cylindrical battery case 5 with an electrolyte and sealed with a sealing portion 6. However, the configuration of the rechargeable lithium battery is not limited to the structure shown in FIG. 1, as it can be readily modified into other types of batteries including prismatic batteries, pouch type batteries and other types of batteries as are well understood in the related art.

Furthermore, the negative electrode for the rechargeable lithium battery may be, for example, a sheet-shaped electrode formed by solidifying the negative active material with a binder. Further examples include a pellet solidified in a disc shape, a cylinder shape, a plane shape, or a conical shape.

The binder may be either an organic or an inorganic material capable of being dispersed or dissolved in a solvent with a negative active material. The active materials are bound with each other by removing the solvent. Furthermore, the binder may be a material capable of being dissolved with the active material and binding the alloy powder by a solidification process such as a press shaping process. Examples of binders include resins such as vinyl based resins, cellulose based resins, phenol resins, and thermoplastic resins. More specific examples include polyvinylidene fluoride, polyvinyl alcohol, carboxymethyl cellulose, styrene butadiene rubber, and similar materials.

In addition to the negative active material and the binder, the negative electrode may be prepared by further adding carbon black, graphite powder, carbon fiber, metal powder, metal fiber, or some other material as a conductive agent.

Subsequently, the positive electrode comprises, for example, a positive active material capable of intercalating and deintercalating the lithium such as $LiMn_2O_4$, $LiCoO_2$, $LiNiO_2$, $LiFeO_2$, $V_2O_5$, TiS, MoS, organodisulfide compounds, organopolysulfide compounds, and a Ni, Mn, or Co based composite oxide. The positive electrode may further include a binder such as polyvinylidene fluoride, and a conductive agent such as carbon black in addition to the positive active material.

One specific example of a positive electrode is a sheet-shaped electrode prepared by coating the current collector of a metal foil or a metal mesh.

The electrolyte may include an organic electrolyte with which the lithium is dissolved in an aprotic solvent.

Aprotic solvents include those selected from the group consisting of propylene carbonate, ethylene carbonate, butylene carbonate, benzonitrile, acetonitrile, tetrahydrofuran, 2-methyl tetrahydrofuran, γ-butyrolactone, dioxolane, 4-methyl dioxolane, N,N-dimethyl formamide, dimethyl acetamide, dimethyl sulfoxide, dioxane, 1,2-dimethoxy ethane, sulfolane, dichloroethane, chlorobenzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethyl ether, and similar solvents and mixtures of such solvents with other solvents. A preferable solvent includes one solvent selected from the group consisting of propylene carbonate (PC), ethylene carbonate (EC), and butylene carbonate (BC), and one solvent selected from the group consisting of dimethyl carbonate (DMC), methylethyl carbonate (MEC), and diethyl carbonate (DEC).

The lithium salt may include, but is not limited to, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(CxF_2x+1SO_2)(CyF_2y+1SO_2)$ (where x and y are natural numbers), LiCl, LiI, or mixtures thereof, and is preferably any one of $LiPF_6$, $LiBF_4$, $LiN(CF_3SO_2)_2$, and $LiN(C_2F_5SO_2)$.

The electrolyte may further include a polymer such as PEO, PVA, or a similar polymer with any one of the lithium salts, and a polymer electrolyte comprising the polymer in which the organic electrolyte is impregnated.

Further, in addition to the positive electrode, the negative electrode, and the electrolyte, the rechargeable lithium battery may further comprise, if required, any other material such as a separator interposed between the negative electrode and the positive electrode.

As set forth above, the electrode material for a lithium secondary battery has a microcrystalline structure and an interplanar spacing of the Si (111) surface in the above-mentioned range measured using X-ray diffraction, and the cycle characteristics can be improved by applying the electrode material to the negative electrode of the lithium secondary battery.

Also, the specific resistance of the electrode material can be reduced by adding an element Y. Thus, lithium can be easily alloyed with the electrode material upon charge, and the charge and discharge capacity of the electrode material can be increased.

According to the method for preparing the electrode material for a lithium secondary battery, a rapidly solidified alloy powder having a microcrystalline structure can be obtained by rapidly cooling a molten alloy comprising Si and an element X wherein the Si content is no more than the Si content of a composition at the eutectic point of SiX alloy. The Si content can be relatively increased by removing element X from the rapidly solidified alloy powder.

Since the electrode material prepared as above contains Si at a high level and has a microcrystalline structure, it can increase cycle characteristics as well as the charge and discharge capacity. Since the Si content is no more than the Si content of a composition at the eutectic point, Si single phase is not generated in the structure of the rapidly solidified alloy powder, which makes the entire structure microcrystalline.

Hereinafter, the following examples further illustrate the present invention in detail, but they are not to be construed to limit the scope thereof.

EXAMPLE 1

11 parts by weight of granular Si were mixed with 89 parts by weight of Al powder as element X, and dissolved in a high frequency heating method in an argon gas atmosphere to thereby produce a molten alloy. The molten alloy was cooled down rapidly and a thin film was formed by using a roll solidification method with a rotating roll formed of Cu. Then, the thin film was pulverized to produce a rapidly solidified alloy powder having a BET specific surface area of 0.1 $m^2$/g.

Subsequently, 10 g of rapidly solidified alloy powder was immersed in 2N aqueous hydrochloric acid solution for four hours under slow agitation. Then, the rapidly solidified alloy powder was rinsed with purified water and dried at 100° C. for two hours. The rapidly solidified alloy powder was shown to have an average particle diameter of 15 μm. By this process, an electrode material for a lithium secondary battery was prepared.

EXAMPLE 2

An electrode material for a lithium secondary battery was prepared using the same method as in Example 1, except that the molten alloy was prepared by mixing 11 parts by weight of granular Si with 88 parts by weight of Al powder and 1 part by weight of Ag powder, and dissolving the mixture in the high frequency heating method in an argon gas atmosphere.

The BET specific surface area of the rapidly solidified alloy powder directly after pulverization was 0.1 $m^2$/g.

COMPARATIVE EXAMPLE 1

Si powder having an average particle diameter of 15 μm was used as an electrode material for Comparative Example 1.

COMPARATIVE EXAMPLE 2

92 parts by weight of granular Si were mixed with 8 parts by weight of Ag powder and the mixture was dissolved using a high frequency heating method in an argon gas atmosphere to prepare a molten alloy. The molten alloy was cooled down rapidly and formed into a thin film by using a roll solidification method with a rotating roll formed of Cu. Then, the thin film was pulverized to produce a rapidly solidified alloy powder having an average particle diameter of 15 μm. The resulting rapidly solidified alloy powder was used as the electrode material for Comparative Example 2.

For the electrode materials of Examples 1 and 2 and Comparative Examples 1 and 2, the BET specific surface area was measured by a nitrogen adsorption method. Also, qualitative analysis was performed on the structures of the electrode materials by measuring X-ray diffraction, and at the same time, the interplanar spacing of a Si (111) surface was measured. The results of measuring the interplanar spacing, the specific surface area and the X-ray diffraction are shown in Table 1.

TABLE 1

| | Specific Surface Area (m²/g) | Interplanar spacing of (111) Surface (Å) |
|---|---|---|
| Example 1 | 11 | 3.167 |
| Example 2 | 10 | 6.170 |
| Comparative Example 1 | — | 3.145 |
| Comparative Example 2 | — | 3.148 |

As shown in Table 1, the specific surface areas of the electrode materials of Examples 1 and 2 after removal of element X were increased 110 times in the case of Example 1 and 100 times in the case of Example 2, compared to the specific surface area before removal of element X. This is because air pores were generated in the electrode material by the removal of Al. As can be seen from this, the reaction area between Si and lithium can be increased by improving the specific surface area.

Also, Table 1 shows that the interplanar spacing of the (111) surface was increased remarkably in Examples 1 and 2, compared to that of the Comparative Example 2 when Si powder was prepared. This indicates that the electrode materials of Examples 1 and 2 were formed with a microcrystalline structure with low crystalline quality.

In Example 1, only the Si phase was detected, whereas the Si phase and the Ag phase were detected in Example 2. In Comparative Example 1, only the Si phase was detected and the Si phase and the Ag phase were detected in Comparative Example 2. Therefore, it can be seen that the Al added during the preparation of the rapidly solidified alloy powder was removed completely through the elution steps of Examples 1 and 2.

As a result of analyzing the composition ratio of Si and Ag in the electrode material of Example 2, it can be known that 8 wt % Ag was added to Si and this is nearly the same as the composition of the electrode material of Comparative Example 2.

Next, lithium secondary batteries were prepared from the electrode materials of Examples 1 and 2 and Comparative Examples 1 and 2.

70 parts by weight of each electrode material was mixed with 20 parts by weight of graphite powder having an average particle diameter of 3 μm as a conductor, and 10 parts by weight of polyvinylidene fluoride and N-methyl pyrrolidone was added thereto. Then, each mixture was agitated to produce a slurry. Each slurry was deposited on a Cu thin film having a thickness of 14 μm and the Cu thin film was dried and compressed to thereby produce a negative electrode having a thickness of 40 μm. Each resulting negative electrode was cut in a circle shape having a diameter of 13 mm. Between each negative electrode and lithium metal as a counter electrode, a porous polypropylene separator was inserted. Then, an electrolyte was prepared by adding 1.3 mol/L $LiPF_6$ to a mixed solvent in which ethylene carbonate (EC) and diethyl carbonate (DEC) were mixed in a volumetric ratio of 3:7. The electrolyte was injected to each to thereby form coin-type lithium secondary batteries.

Each resulting lithium secondary battery was repeatedly charged and discharged at a voltage of 0V to 1.5V at a current density of 0.2 C for 10 cycles. The discharge capacities of the first cycle and the $10^{th}$ cycle were measured and are shown in Table 2. The calculated discharge capacities are capacities with respect to the weight of electrode materials.

TABLE 2

| | Discharge Capacity of $1^{st}$ Cycle (mAh/g) | Discharge Capacity of $10^{th}$ Cycle (mAh/g) |
|---|---|---|
| Example 1 | 2860 | 1970 |
| Example 2 | 3220 | 2610 |
| Comparative Example 1 | 2830 | 420 |
| Comparative Example 2 | 3200 | 1240 |

The electrode materials of Example 1 and Comparative Example 1 contained only Si. As presented in Table 2, the discharge capacities in the first cycle were nearly the same but the case of Example 1 had a higher value than that of Comparative Example 1 after 10 cycles.

Similarly, the electrode materials of Example 2 and Comparative Example 2 contained 8 wt % Ag with respect to Si, and as seen from Table 2, the discharge capacities were almost the same in the first cycle. However, after 10 cycles, the battery using the negative active material of Example 2 had a higher value than that of Comparative Example 2.

As set forth above, the electrode materials of Examples 1 and 2 obtained by removing Al from the rapidly solidified alloy powder containing Al have superior cycle characteristics to those of Comparative Examples 1 and 2.

This is because the change in volume upon charge and discharge is alleviated due to the decrease in the crystalline quality of Si in Examples 1 and 2, which can also be confirmed from the interplanar spacing values of the (111) surface shown in Table 1.

In addition, the increase in the specific surface area widened the contact area between Si and lithium ions, and thus, helped smooth the alloying process between Si and lithium.

The discharge capacity of Example 2 in each cycle appeared higher than that of Example 1. This is because the utility rate of Si was increased as the specific resistance of the electrode material was decreased due to the addition of Ag as set forth in Example 2 and the alloying process between Si and lithium was performed even more smoothly.

As described above, since the electrode material for a lithium secondary battery of the present invention has a high Si content and a microcrystalline structure, the charge and discharge capacity can be increased and the cycle characteristics can be improved.

While the present invention has been described with respect to certain preferred embodiments, it will be apparent to those skilled in the art that various changes and modifications may be made without departing from the scope of the invention as defined in the following claims.

What is claimed is:

1. A method for preparing an electrode material for a lithium secondary battery, comprising:
preparing a rapidly solidified alloy by rapidly cooling a molten alloy comprising Si and an element X, where X is selected from elements that can be alloyed with Si, wherein the content of Si in the molten alloy is no more than the Si content of a composition at the eutectic point of an SiX alloy; and removing element X from the rapidly solidified alloy, wherein the Si content of the rapidly solidified alloy is between 70 wt % and 100 wt %.

2. The method of claim 1 wherein X is removed by immersing the rapidly solidified alloy in a solution that can dissolve X.

3. The method of claim 1 wherein X is selected from the group consisting of Al, B, P, Ge, Sn, Pb, Ni, Co, Mn, Mo, Cr, V, Cu, Fe, Ni, W, Ti, Zn, alkali metals, alkaline earth metals and combinations thereof.

4. The method of claim 1 wherein the molten alloy further includes an element Y selected from the group consisting of Ag, Cu, Au and combinations thereof.

5. A method for preparing an electrode material for a lithium secondary battery, comprising:

preparing a rapidly solidified alloy by rapidly cooling a molten alloy comprising Si, an element X selected from the group consisting of Al, B, P, Ge, Sn, Pb, Ni, Co, Mn, Mo, Cr, V, Cu, Fe, Ni, W, Ti, Zn, alkali metals, alkaline earth metals and combinations thereof, and an element Y selected from the group consisting of Ag, Cu, Au and combinations thereof, wherein both X and Y are not Cu, and wherein the content of Si in the molten alloy is no more than the Si content of a composition at the eutectic point of an SiX alloy; and removing element X from the rapidly solidified alloy, wherein the Si content of the rapidly solidified alloy is between 70 wt% and 100 wt %.

* * * * *